US009854010B2

(12) United States Patent
Raghavan et al.

(10) Patent No.: US 9,854,010 B2
(45) Date of Patent: Dec. 26, 2017

(54) SMART NOTIFICATIONS USING A CALENDAR

(71) Applicant: Microsoft Corporation, Redmond, WA (US)

(72) Inventors: Vaidyanathan Raghavan, Issaquah, WA (US); Bradley Stevenson, Seattle, WA (US); Gail Giacobbe, Seattle, WA (US); Xuelei Sun, Redmond, WA (US); March Rogers, Redmond, WA (US); Bojana Ostojic, Seattle, WA (US); Nathaniel Eric Breskin Auer, Redmond, WA (US); Ellen Steele, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/920,908

(22) Filed: Jun. 18, 2013

(65) Prior Publication Data

US 2014/0372525 A1 Dec. 18, 2014

(51) Int. Cl.
*H04L 29/06* (2006.01)
*G06Q 10/10* (2012.01)
(Continued)

(52) U.S. Cl.
CPC ....... *H04L 65/1093* (2013.01); *G06Q 10/109* (2013.01); *G06Q 10/1093* (2013.01);
(Continued)

(58) Field of Classification Search
CPC .............. H04L 65/403; G06Q 10/1093; G06Q 10/1097
(Continued)

(56) References Cited

U.S. PATENT DOCUMENTS 6,920,328 B2   7/2005   Wollrab
6,993,325 B1*  1/2006   Waesterlid ................. 455/414.1
(Continued)

FOREIGN PATENT DOCUMENTS

CN       1551011 A     12/2004
CN     102393924 A      3/2012

OTHER PUBLICATIONS

"Calendar: Advance Features; Set up reminders, sharing, secondary calendars, and more!" —PMSD, Jun. 2010 https://www.pmsd.org/cms/lib/PA01916596/Centricity/Domain/284/advancedscheduling.pdf.*

(Continued)

*Primary Examiner* — Randy Scott
(74) *Attorney, Agent, or Firm* — Merchant & Gould P.C.

(57) ABSTRACT

Notifications are delivered to a user based in part on a user's current context. The notifications may be based on personal information (e.g. calendar events, tasks, alerts, and the like) as well as a context of a user. The notifications may be delivered using different types of notifications. The type of notification selected may be based on the current context of the user. Notifications may also be sent to other users (e.g. that are part of a trusted group) in response to a change in state of the event (e.g. the task completed). Instead of a user receiving notifications at preset times, notifications are delivered to the user using their current context. A group member may also create a message to another member requesting an action. When a response is made, the requesting group member receives a notification and the other group members may also receive notifications.

20 Claims, 12 Drawing Sheets

(51) Int. Cl.
*H04W 4/02* (2009.01)
*H04L 29/08* (2006.01)
*H04W 4/08* (2009.01)

(52) U.S. Cl.
CPC ..... *G06Q 10/1097* (2013.01); *H04L 65/1069* (2013.01); *H04L 67/18* (2013.01); *H04L 67/26* (2013.01); *H04W 4/02* (2013.01); *H04L 67/303* (2013.01); *H04W 4/08* (2013.01)

(58) Field of Classification Search
USPC .............. 709/204, 205, 206, 223, 224, 225; 715/750, 752, 758, 781
See application file for complete search history.

(56) References Cited

U.S. PATENT DOCUMENTS

| | | | | |
|---|---|---|---|---|
| 8,463,872 | B2* | 6/2013 | Pounds | H04L 51/14 455/466 |
| 2005/0221820 | A1 | 10/2005 | Ruetschi | |
| 2006/0230137 | A1* | 10/2006 | Gare et al. | 709/224 |
| 2008/0032703 | A1 | 2/2008 | Krumm et al. | |
| 2009/0119590 | A1 | 5/2009 | Kondziela et al. | |
| 2009/0158200 | A1* | 6/2009 | Palahnuk | G06Q 30/00 715/781 |
| 2010/0159871 | A1 | 6/2010 | Tester | |
| 2010/0159967 | A1* | 6/2010 | Pounds et al. | 455/466 |
| 2010/0217641 | A1* | 8/2010 | Siegel | G06Q 10/00 705/7.24 |
| 2011/0029622 | A1* | 2/2011 | Walker et al. | 709/206 |
| 2012/0317162 | A1 | 12/2012 | Endsley et al. | |
| 2013/0151637 | A1 | 6/2013 | Bedikian | |

OTHER PUBLICATIONS

Gordon, Whitson, "How to Turn Your Phone Into a Mind-Reading Personal Assistant", Published on: Oct. 9, 2012, Available at: http://lifehacker.com/5950162/how-to-turn-your-phone-into-a-mind+reading-personal-assistant.

Lilyquist, Mindy, "Cozi: An Online Family Calendar Review", Published on: Jun. 21, 2011, Available at: http://homebusiness.about.com/od/Home_Business_Toolbox/fr/Cozi-An-Online-Family-Calendar-Review.htm.

Davies, Chris, "T-Mobile UK to offer ICD Vega 15-inch Tegra Android tablet in 2010", Published on: Jan. 7, 2010, Available at: http://www.slashgear.com/t-mobile-uk-to-offer-icd-vega-15-inch-tegra-android-tablet-in-2010-0768671/.

International Search Report dated Apr. 22, 2015, cited in Application No. PCT/US2014/41098, 9 pgs.

International Search Report Issued in European Application No. 14737376.5, dated Dec. 7, 2016, 10 Pages.

First Office Action and Search Report Issued in Chinese Patent Application No. 201480035104.4, dated Jun. 2, 2017, 13 Pages.

"Office Action Issued in European Patent Application No. 14737376.5", dated Sep. 26, 2017, 9 Pages.

* cited by examiner

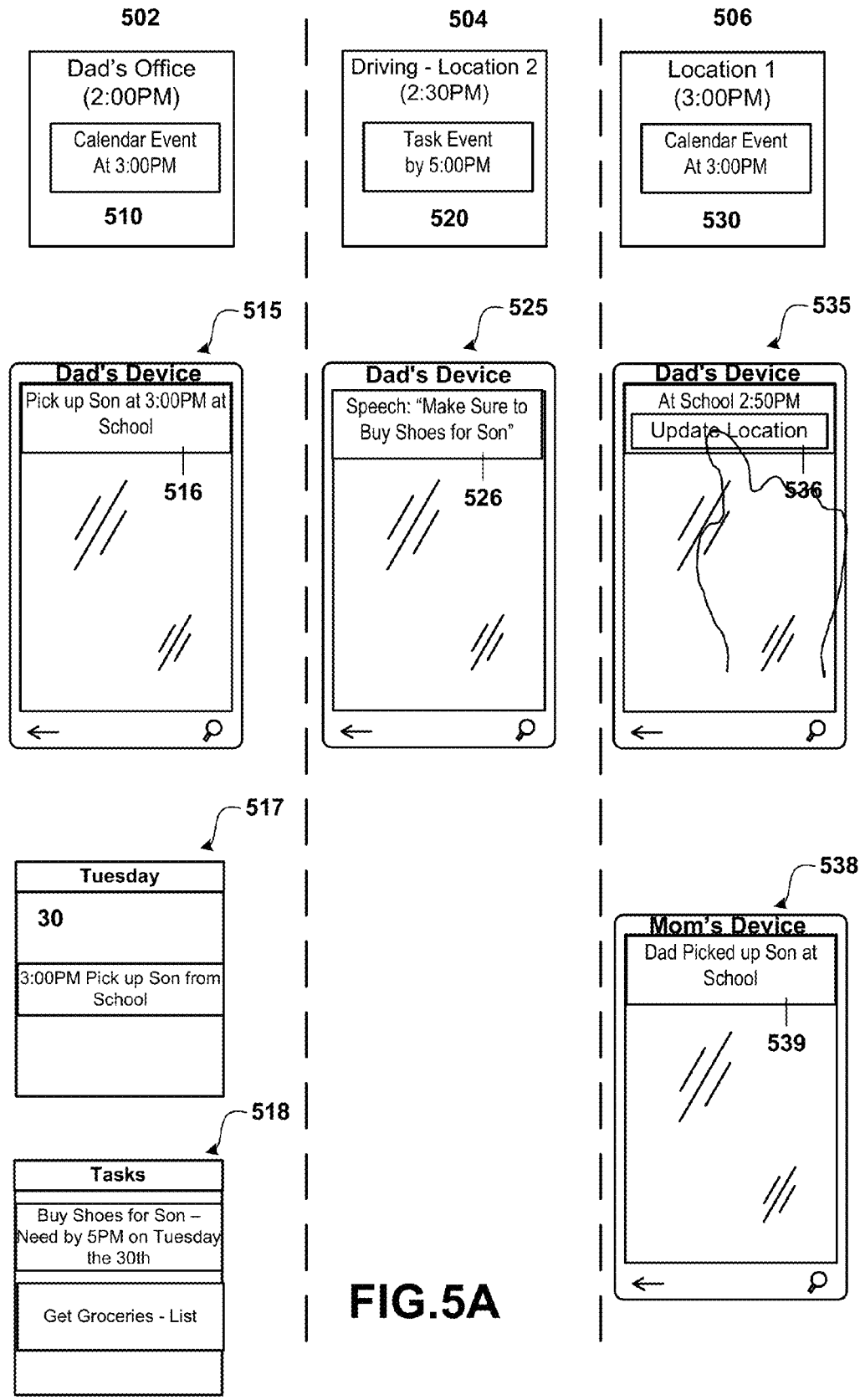

SMART NOTIFICATIONS USING A CALENDAR

BACKGROUND

There are many applications and services that provide location information. Some applications display location information for a device (e.g. a location of a computing device) or a destination, as well as location information for a user. There are many situations in which a person may want to know where another person is currently located. For example, a parent may want to know where a family member is currently located, a worker may want to know where co-workers are located, and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Notifications are delivered to a user based in part on a user's current context. The notifications may be based on personal information (e.g. calendar events, tasks, alerts, and the like) as well as a context of a user. For example, instead of delivering a notification just using a predetermined time, a reminder notification that is based on a task to buy milk may be delivered to a user in response to the user being located near a grocery store. Notifications may also be sent to other users (e.g. that are part of a trusted group) in response to a task being completed by another group member. Notifications for a sequence of tasks are adjusted based on the current user context. Instead of the user viewing all of the tasks at one time, the task notifications are delivered to the user when the task may be performed. For example, after one task is performed, the user may receive a notification that there is another task to perform near their current location. A group member may also create a message to another member requesting an action. When a response is made, the requesting group member receives a notification and the other group members may also receive notifications.

BRIEF DESCRIPTION OF THE DRAWINGS

FIG. 5A and FIG. 5B illustrate interactive notifications relating to different events based on a current context;

DETAILED DESCRIPTION

Figure 1:
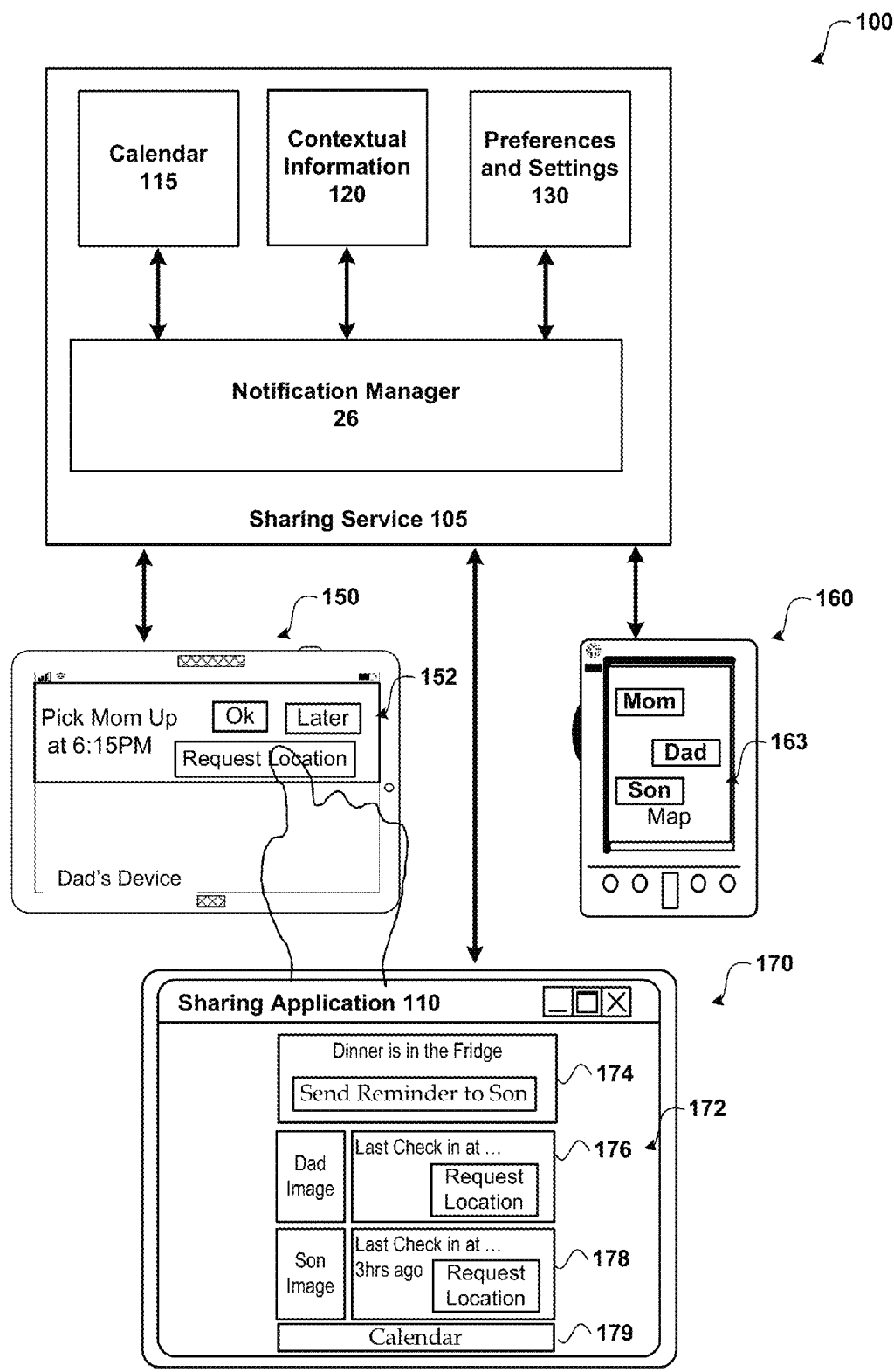
FIG. 1 shows a system using contextual information in determining how to deliver a notification that is associated with a calendar event.

Referring now to the drawings, in which like numerals represent like elements, various embodiment will be described elements, various embodiment will be described.

FIG. 1 shows a system using contextual information in determining how to deliver a notification that is associated with a calendar event.

As illustrated, system 100 includes sharing application 110, calendar 115, contextual information 120, preferences and settings 130, notification manager 26, tablet computing device 150, smart phone device 160, and computing device 170.

Notification manager 26 is configured to deliver notifications to a user based in part on the user's current context. The notifications may be based on personal information (e.g. calendar events, tasks, alerts, and the like) as well as a context of a user. For example, instead of delivering a notification at a predetermined time, a reminder notification that is based on a task to buy milk may be delivered by notification manager 26 to a user in response to the user being located near a grocery store. The notifications may be delivered by notification manager 26 using different types of notifications (e.g. Short Messaging Service (SMS); toast notifications, information bar messages, electronic messages, and the like).

Notification manager 26 may select the type of notification based on the current context of the user. For example, the type of notification may be selected based on where the user is located and/or what computing device currently being used by the user.

A user may configure preferences and settings 130 that are associated with delivering the notifications and using contextual information. For example, a user may configure permissions that specify what contextual information may be collected and shared, as well as specify preferences in how notifications are delivered.

Notifications may also be sent to other users (e.g. that are part of a trusted group) by notification manager 26 in response to a state change of an event. For example, a task may be completed by another group member, a user may update a status of an event, and the like. The group members may also be notified when a group member's location is updated. For example, when a user performs a check-in at a location, notification manager 26 may automatically share the location with the other members.

Notifications for a sequence of tasks is adjusted by notification manager 26 based on the current user context. Instead of the user viewing all of the tasks at one time, the task notifications are delivered to the user when the task may be performed. For example, after one task is performed, the user may receive a notification that there is another task to perform near their current location. A group member may also create a message to another member requesting an action. When a response is made, the requesting group member receives a notification and the other group members may also receive notifications.

Computing device 170 shows an example graphical user interface 172 for a sharing application. As illustrated, interface 172 shows different members of a family group. Section 176 displays a last check in status for the Dad, an image of Dad, and a Request Location element. Section 178 displays a last check in status for the son, an image of the son, content related to the son, and a Request Location element.

In response to the selection of a request location user interface element, a location request is sent to the associated user requesting their current location. According to an embodiment, when the location request is accepted by the user, the requesting user receives current location for the user and the other members of the group receive the current location of the user.

Section 174 illustrated in interface 172 shows creating a reminder in sharing application 110 to send to the son. In the current example, Mom is creating a reminder to inform the son that dinner is in the refrigerator. Mom selects the Send Reminder option after creating the reminder. According to an embodiment, the reminder may be sent to the son based on the content of the message and the Son's current context. For example, Mom may create and select the Send Reminder option in the morning but the reminder is not delivered to the Son until the Son is at home later in the day.

Tablet computing device 150 shows a message 152 sent to Dad's device indicating to pick Mom up at 6:15 PM. Notification manager 26 may deliver message 152 at a predetermined time and/or using contextual information that is associated with Dad. For example, notification manager 26 may send message 152 to Dad after the Dad leaves his office. Message 152 also includes an Ok option to acknowledge the message, a Later option to set a future reminder for the message and a request location element. In response to the selection of the request location user interface element, a location request is sent to Mom requesting her current location. When the location request is accepted by Mom, Dad receives Mom's current location and the other members of the group (e.g. the Son) may also receive Mom's current location.

Smart phone 160 shows a display 163 of a map that shows a last reported location for each of the group members. For example, the son may display the map showing the location of the other family members.

In order to facilitate communication with notification manager 26, one or more callback routines, may be implemented. Application 110 may be a variety of applications, such as sharing applications, business productivity applications, entertainment applications, music applications, travel applications, video applications, and the like. Generally, application 110 may be any application that delivers or receives notifications as described herein. Application 110 may be configured to interact with sharing service 105. Application 110 may be configured to receive different types of input (e.g. touch input, speech input, keyboard input (e.g. a physical keyboard and/or Software Input Panel (SIP)) and/or other types of input.

System 100 as illustrated comprises one or more touch screen input devices, such as tablet computing device 150 and smart phone device 160, that detects when a touch input has been received (e.g. a finger touching or nearly touching the touch screen). Any type of touch screen may be utilized that detects a user's touch input. More details are provided below.

Figure 2:
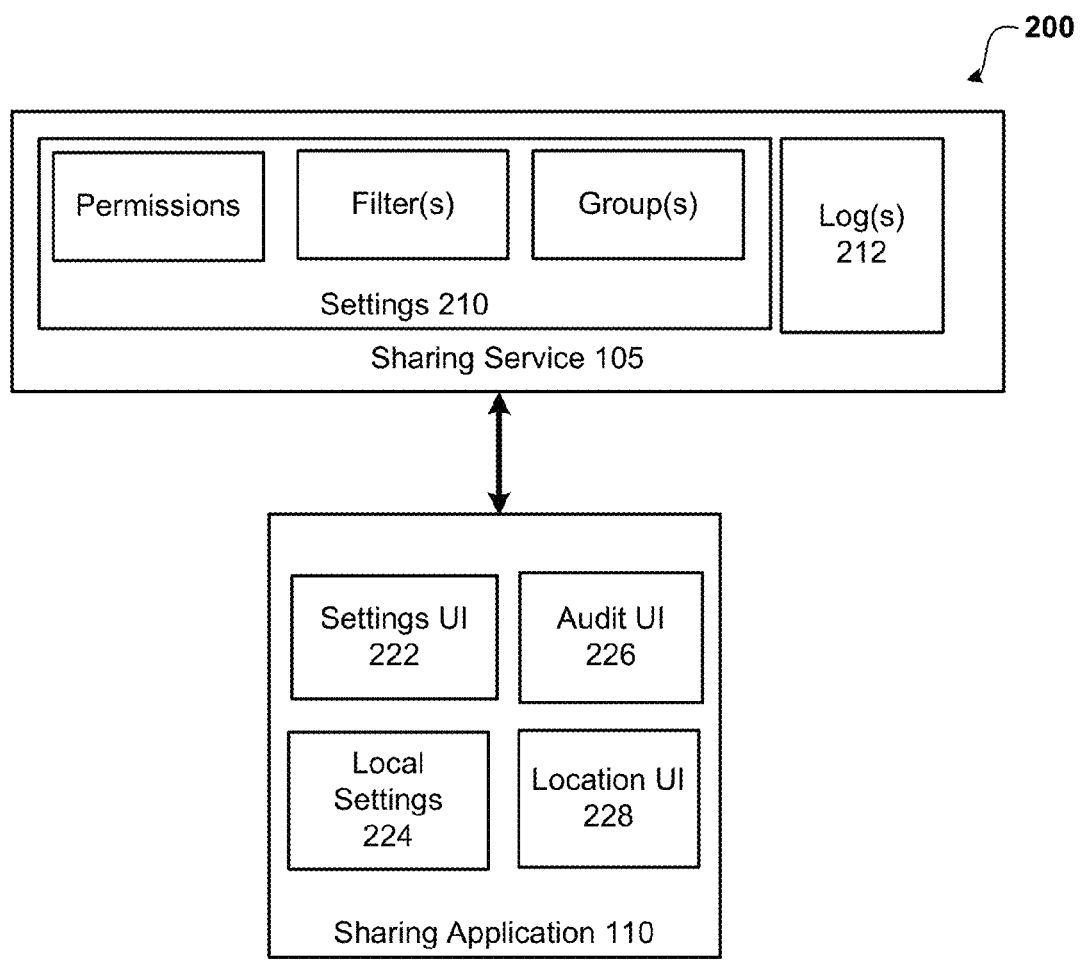
FIG. 2 shows interactions between a sharing program and a sharing service for configuring permissions.

FIG. 2 shows interactions between a sharing program and a sharing service for configuring permissions.

As illustrated, FIG. 2 shows sharing service 105 including settings 210 and log(s) 212 and sharing application 110 that includes settings user interface 222, audit user interface 226, location user interface 228 and local settings 224.

A user may configure different criteria, such as permissions, filters and group settings that are related to the operation of the sharing application 110. For example, an authorized user may add or remove a group member from a group.

The user may set permissions that specify what information the user allows to share with other members in a group. For example, a user may opt-in to allow different types of information to be shared with group members before any information is shared. A user may decide to share location information with one user in a group but may not share location information with another member in the group.

A user may also configure one or more filter(s) that may filter the shared information as determined by the set permissions based on various criteria (e.g. time of day, requesting device, requesting location, and the like). For example, a user may allow another user to receive location information, but would like the location information to show a general location as compared to detailed location information. The user may also configure filters to restrict an amount of information one or more members of a group are made available. For example, a father or mother may set permission and filtering criteria that allows a caregiver to see their child's location from a computing device that is in the home of the mother and father as long as the request occurs between the caregiver's work hours. A user may also set local settings 224 such as application customization settings (e.g. color schemes, icons and the like) for use when displaying location user interface 228.

Audit user interface 226 may be used by an authorized user to view and interact (e.g. delete) with previously made/received location requests stored in log 212. Access to the log related data is limited to an authorized user who has provided the correct security credentials. The data is stored securely within log(s) 212.

Figure 3:
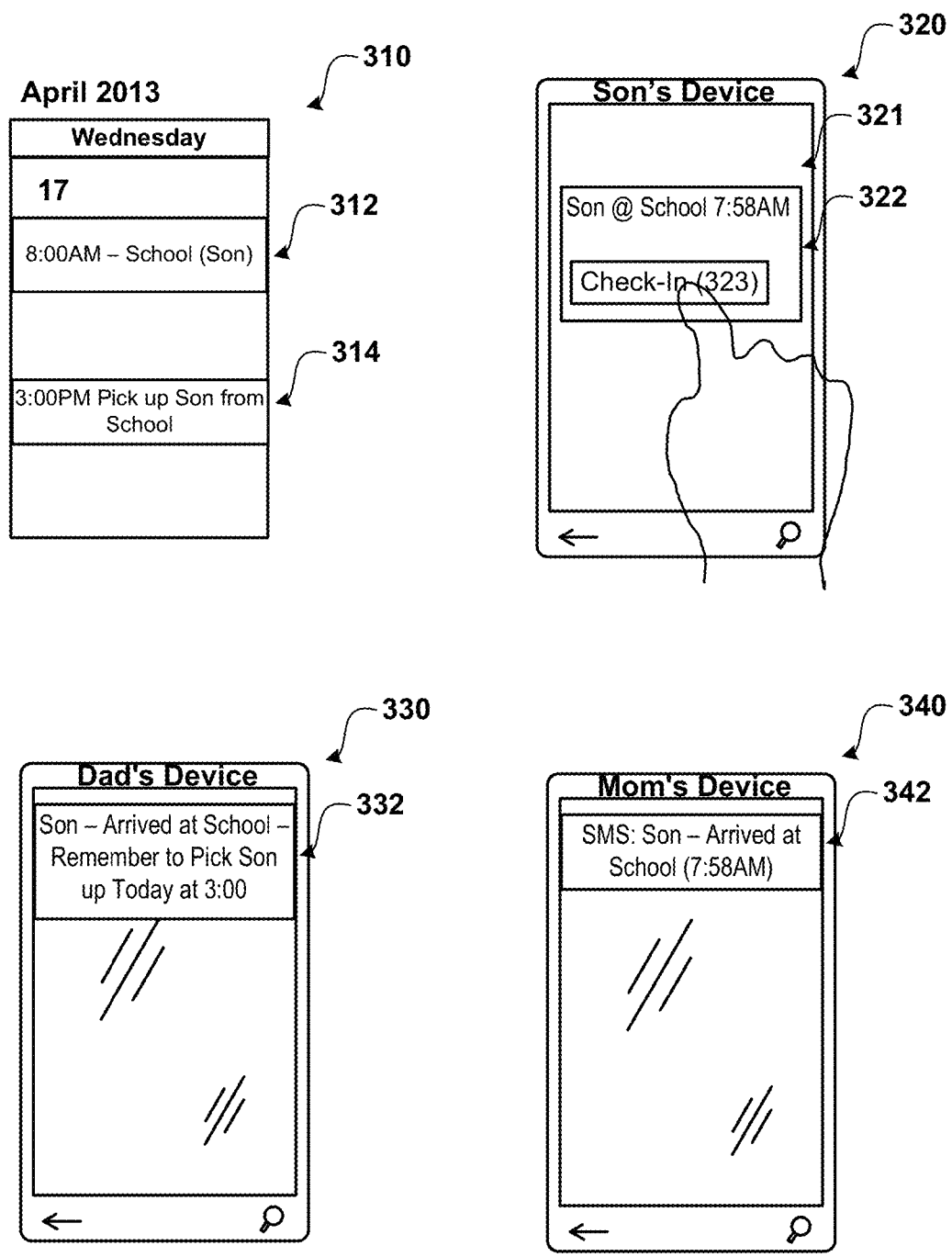
FIG. 3 shows delivering notifications to group members based on a calendar event.

FIG. 3 shows delivering notifications to group members based on a calendar event.

As illustrated, FIG. 3 shows calendar view 310, device 320, device 330 and device 340.

Calendar view 310 shows example appointments involving the son. Calendar 310 includes appointment 312 that indicates that the Son is to be at school by 8:00 AM. Appointment 314 indicates that the Son is to be picked up from school at 3:00 PM. In the current example, appointments 312 and 314 may be set as recurring appointments that occur daily from Monday to Friday. The appointments may be set by an authorized user. For example, one or more members of a trusted group (e.g. the family in this example) may set appointments on the calendar. According to an embodiment, calendar view 310 is a shared calendar between members of a group. In the current example, the group is the family that includes a Son member, a Mom member and a Dad member. According to another embodiment, the calendar may be associated with a single user.

Device 320 (Son's device) illustrates display 321 including notification 322 that is created and delivered to the son based on appointment 312 in Calendar view 310. In the current example, notification 322 shows that the son has arrived at school at 7:58 AM and includes a "Check-In" option 323. According to an embodiment, a "check-in" is a status update that is manually made by a user when they want to share their current status, such as location information. A user may check-in for a variety of different reasons. For example, the user may check-in to show that they have reached a destination. In the current example, the son has selected the "Check-In" option 323. In response to the son checking in, the status is provided to the other group members (e.g. Mom and Dad in this example) that are authorized to receive the status update.

Device 330 (Dad's device) illustrates notification 332. Notification 332, shows that the son arrived at school and also includes a reminder for another event later in the day that relates to the son. As illustrated, notification 332 is a toast notification. Other types of notifications may be used (e.g. email, SMS, information bar message, . . . ).

Device 340 (Mom's device) illustrates notification 342. Notification 342, shows that the son arrived at school at 7:58 AM. As illustrated, notification 342 is an SMS message. Other types of notifications may be used.

Figure 4:
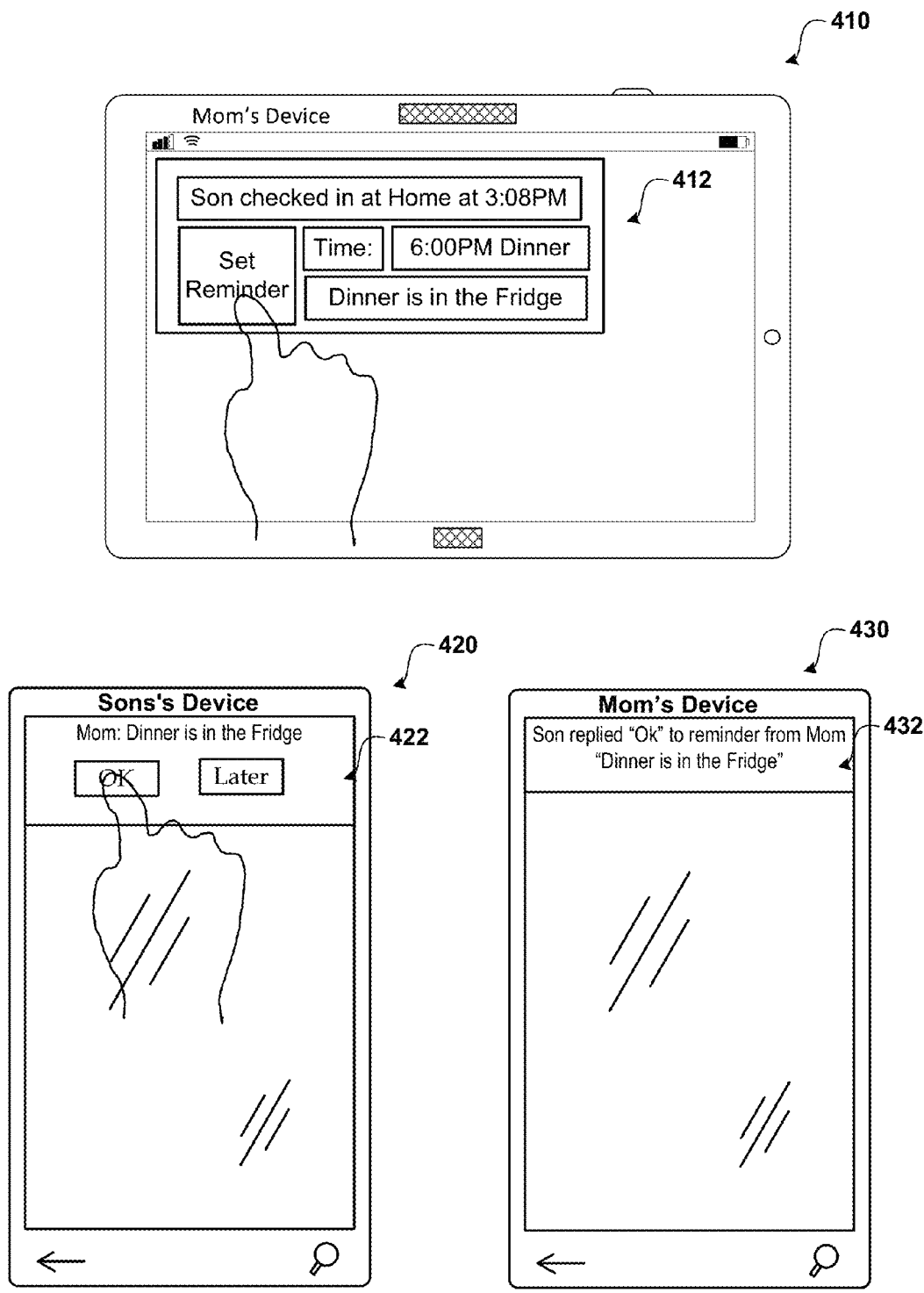
FIG. 4 illustrates sending notifications and setting a reminder.

FIG. 4 illustrates sending notifications and setting a reminder.

As illustrated, FIG. 4 shows tablet device 410, smart phone device 420 and smart phone device 430.

Device 410 ("Mom's Device") shows notification 412. Notification 412 is sent in response to the son arriving home. As illustrated, Mom is setting a reminder to deliver to the son. The reminder may include different fields that may be set by the user. For example, a user may set a time with the reminder and a message with the reminder. In the current example, Mom has set the time to be 6:00 PM and has set the message to "Dinner is in the Fridge." The reminder may be set using different methods. For example, the reminder may be set directly from within a received notification (as illustrated) or set using some other method. The user may select an option in the sharing application to set one or more reminders, speak a voice command to create a reminder, and the like.

Device 420 (Son's device) illustrates notification 422. Notification 422 is a reminder notification that is sent in response to a reminder being set. Notification 422 includes the reminder, who sent the reminder, and an acknowledge option ("OK") and a delay option ("Later"). In the current example, the son has selected the acknowledge option. According to an embodiment, an acknowledgement notification is sent to the creator of the reminder when the reminder is acknowledged. According to another embodiment, an acknowledgement reminder is set to one or more of the other group members.

Device 430 (Mom's device) illustrates acknowledgement notification 432. Notification 432 is an acknowledgement notification sent in response to a user acknowledging a reminder created by the user. Notification 432 includes a message indicating that the person acknowledged the reminder. In the current example, notification 432 identifies who received the reminder, who created the reminder, the reminder and the acknowledgement. As illustrated, Mom may create a reminder on one device and receive the acknowledgement notification on another type of device.

Figure 5B:
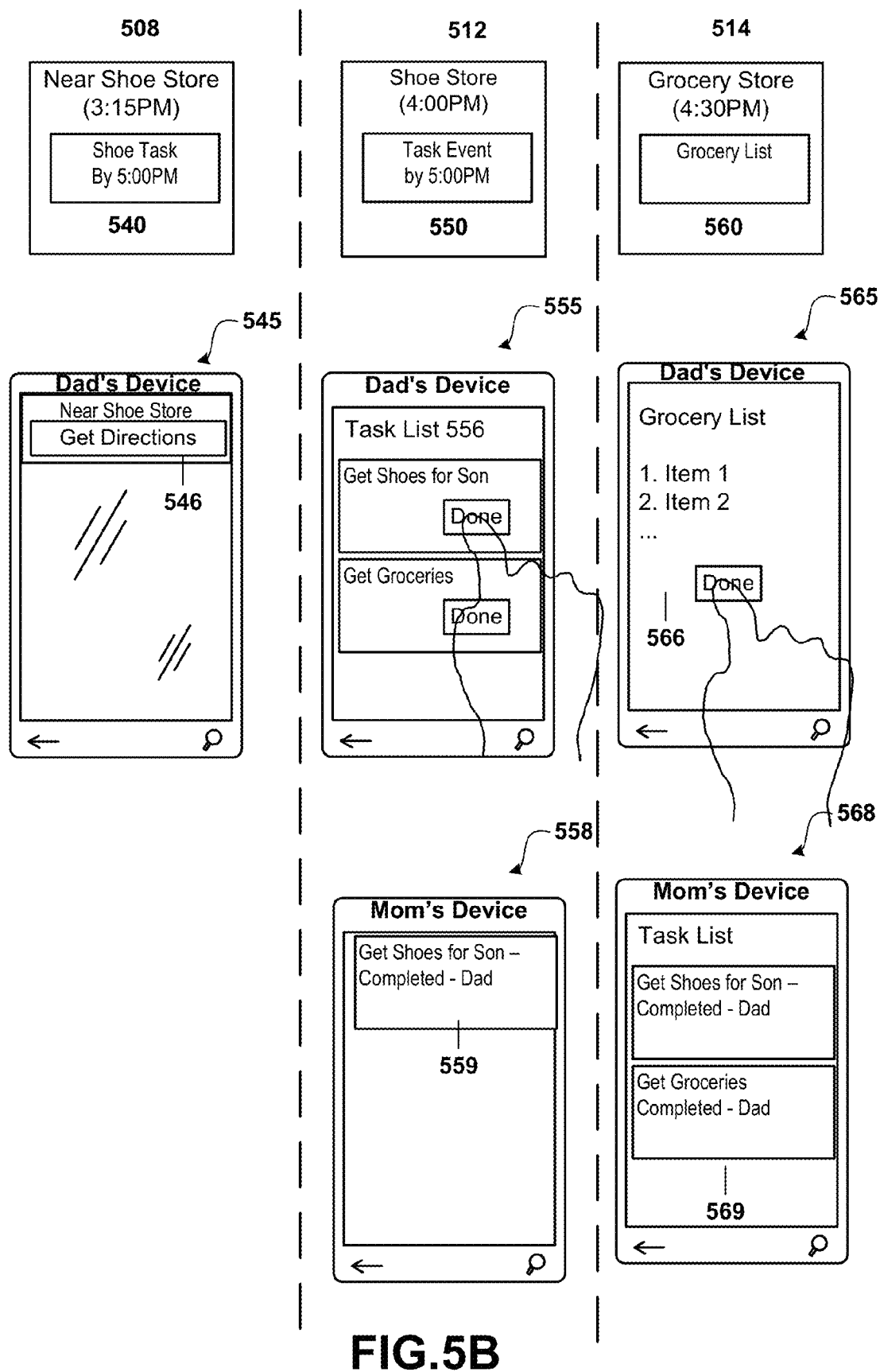

FIG. 5A and FIG. 5B illustrate interactive notifications relating to different events based on a current context.

As illustrated, FIG. 5A and FIG. 5B shows different time periods (502, 504, 506, 508, 512 and 514) during a day and different notifications being sent based on the context of users. The examples presented herein are intended for explanation purposes and are not intended to be limiting. The current example, includes a group of family members including a son, a dad, and a mom. Other groups may be created and used.

Instead of displaying a reminder at a certain time, contextual information is used to determine when to send a notification. The notifications may include traditional reminders, location-centric reminders, interactive reminder notifications, update notifications and the like. Traditional reminder notifications are based on appointments on a calendar. Location-centric reminder notifications are delivered when a user is determined to be close to some place or some person. Interactive reminder notifications are based on a current state of a task. Update notifications are delivered in response to an update being received (e.g. a state change).

Calendar view 517 shown on FIG. 5A shows a calendar appointment at 3:00 PM to pick up the son from school. Tasks view 518 shows two tasks. The first task is to Buy shoes for the son and complete the task by 5:00 PM on Tuesday the 30$^{th}$. The second task is to get groceries and includes a list of groceries to buy.

Time period 502 shows that Dad is in his office at 2:00 PM and that there is a calendar event coming up at 3:00 PM. Display 515 ("Dad's Device) shows notification 516. Notification 516 is a reminder notification that reminds Dad to pick up Son at 3:00 PM at school. The notification is sent to Dad using the appointment information obtained from a calendar and may also use contextual information. A time when notification is sent may be automatically adjusted based on: the location of where Dad currently is as compared to the location of the school; what activity Dad is currently doing; how Dad is getting to the school and the like. For example, it may be determined (e.g. from a calendar) that Dad will be in a meeting between 2 and 2:30 and will not be able to receive notifications during this time. In response, notification 516 may be delivered before or after the meeting.

Time period 504 shows that Dad is driving at 2:30 PM and that there is a task event due by 5:00 PM. In the current example, the task event due by 5:00 PM is to buy shoes for the son. Display 525 ("Dad's Device") shows notification 526. Notification 526 is a toast notification that reminds Dad to buy shoes for the son. According to an embodiment, the type of notification is determined based on a context of the user. For example, when it is determined that Dad is driving, the notification may be delivered using speech from Dad's device. Other notification methods may be used. For example, when Dad is not driving, the notification may an SMS message, a toast notification, an email, and the like.

Time period 506 shows that Dad arrived at school at 2:50 PM and that there is a calendar event to pick up the son at 3:00 PM. Display 535 ("Dad's Device") shows notification 536. Notification 536 shows that Dad has arrived at school at 2:50 PM and display an Update Location option (e.g. a check-in option) that allows Dad to share his current location with the other family members. In the current example, Dad has selected the Update Location option. In response to the selection, Dad's current location is shared with the other family members.

Display 538 ("Mom's Device") shows notification 539 indicating that Dad arrived at the school and picked up the son. According to an embodiment, Mom may select notification 539 to access further the sharing application and perform other operations (e.g. sending a reminder, setting an event, viewing locations of other group members when authorized, and the like).

FIG. 5B shows time periods 508, 512 and 514.

Time period 508 shows that Dad is near a shoe store at 3:15 PM and there is still a task to buy shoes that is to be completed by 5:00 PM. Display 545 ("Dad's Device") shows notification 546. Notification 546 shows Dad that he is near a shoe store and includes an option to get directions to the shoe store. The directions may be provided by a map service, a navigation service, and the like. In response to selecting the Get Directions option in notification 546, directions to the shoe store are delivered to Dad.

Time period 512 shows that Dad is at the shoe store at 4:00 PM and there is still a task to buy shoes that is to be completed by 5:00 PM. Display 555 ("Dad's Device") shows task list 556. Task list 556 shows the current active tasks that still need to be completed. In the current example, the task list 556 is displayed instead of a notification. According to another embodiment, a notification is delivered that includes an option for the user to indicate that the task is complete. As shown in display 555, Dad has selected the "Done" option in the task to get shoes for the son. In response to completing the shoe task, a notification may be sent to one or more group members indicating that the task is complete. For example, the notification may be sent to each of the other group members or to group members who indicated that they would like to be notified of status changes relating to the task.

Display 558 ("Mom's Device") shows notification 559 indicating that Dad has completed the shoe task.

Time period 514 shows that Dad is at the grocery store at 4:30 PM and there is still a task to buy groceries. Display 565 ("Dad's Device") shows grocery list 566. Grocery list 566 shows the list of groceries that is associated with the grocery task. In the current example, the grocery list 566 is displayed instead of a notification. According to another embodiment, a notification is delivered that includes an option to display the grocery list. As shown in display 565, Dad has selected the "Done" option in the grocer list. In response to completing the grocery task, a notification may be sent to one or more group members indicating that the task is complete.

Display 568 ("Mom's Device") shows task list 569 indicating that Dad has completed both the shoe task and the grocery task.

Figure 6:
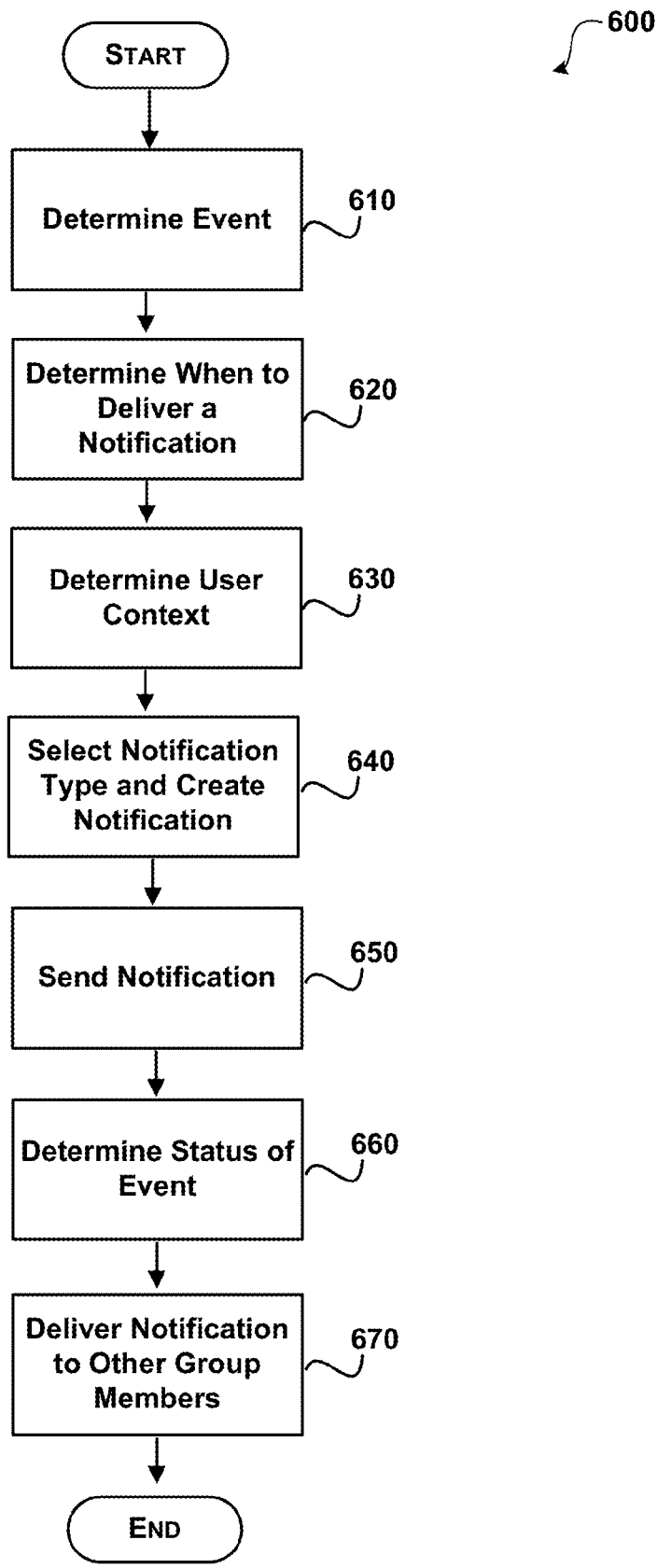
FIG. 6 shows a process for sending notifications using a current context that is associated with a user.

FIG. 6 shows a process for sending notifications using a current context that is associated with a user. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change, be performed in parallel, depending on the implementation.

After a start operation, the process moves to operation 610, where an event is determined that relates to a user or a group. The event may be many different types of events. For example, an event may be a calendar event (e.g. an appointment, meeting, . . . ), a task event, and the like. According to an embodiment, the events are associated with a group, such as a family or some other trusted group. The group members may be a work group, a friend group, and the like. Generally, the group includes associated members that are trusted to share event information and receive notifications relating to other group members. The event to associate with a notification may be determined from a shared calendar for the group, an individual calendar, a task list, and the like. One or more group members may be authorized to create events.

Flowing to operation 620, a determination is made as to when to deliver a notification. Instead of delivering a notification at a predetermined time, contextual information is used to determine when to send a notification. The notifications may include traditional reminders, location-centric reminders, interactive reminder notifications, update notifications and the like. Traditional reminder notifications are based on appointments on a calendar. Location-centric reminder notifications are delivered when a user is determined to be close to some place or some person. Interactive reminder notifications are based on a current state of a task. Update notifications are delivered in response to an update being received.

Moving to operation 630, current user context is determined. The current context for one or more of the group members may be determined. For example, the current context of the group members to receive the notification may be determined. The context may include contextual information such as where the user is located, what computing device is currently being used by the user, the current activity of the user, events relating to the user, and the like. The group members may determine what contextual information is collected or used. For example, a user may opt-in to allow all or a portion of contextual information to be collected and used.

Transitioning to operation 640, the notification type used to deliver the notification is determined. The notification type may be the same or different for each of the group members receiving the notification. For example, one group member may receive the notification using an SMS message, another group member may receive a spoken notification, another group member may receive a toast notification, and the like. According to an embodiment, the notification type is selected based on a computing device currently being used by the user and whether or not the sharing application is running on the device. For example, when the sharing application is running on a group member's device then a notification may be delivered from within the sharing application. Example notification types that may be used, but are not limited to: toast notifications (e.g. a small informational window), electronic mail (emails); Short Messaging Service (SMS); Enhanced Messaging Service (EMS); Multimedia Messaging Service (MMS); Instant Messaging (IM); social network posts/messages; information bar messages (e.g. within a header area), a live tile update (e.g. showing an indication of a message on an icon on a display), and the like.

Flowing to operation 650, the notification is sent to the group members designated to receive the notification using the selected notification type.

Moving to decision operation 660, a status of the event is determined. For example, the event may be a task that has not been completed, is in the process of being completed or has been completed. According to an embodiment, when an event has been completed, a notification is automatically sent to other group members (operation 670). A user may manually select an option (e.g. within the sharing application or from within a notification) that a status has changed or the determination may be made automatically. For example, when a user reaches a particular location that is associated with the event, the status may automatically change.

Flowing to operation 670, a notification is automatically shared with the other group members that are authorized (e.g. as determined by checking the settings). Instead of each group member having to request a status of an event, the information is shared with each other group member.

The process then flows to an end block and returns to processing other actions.

Figure 7:
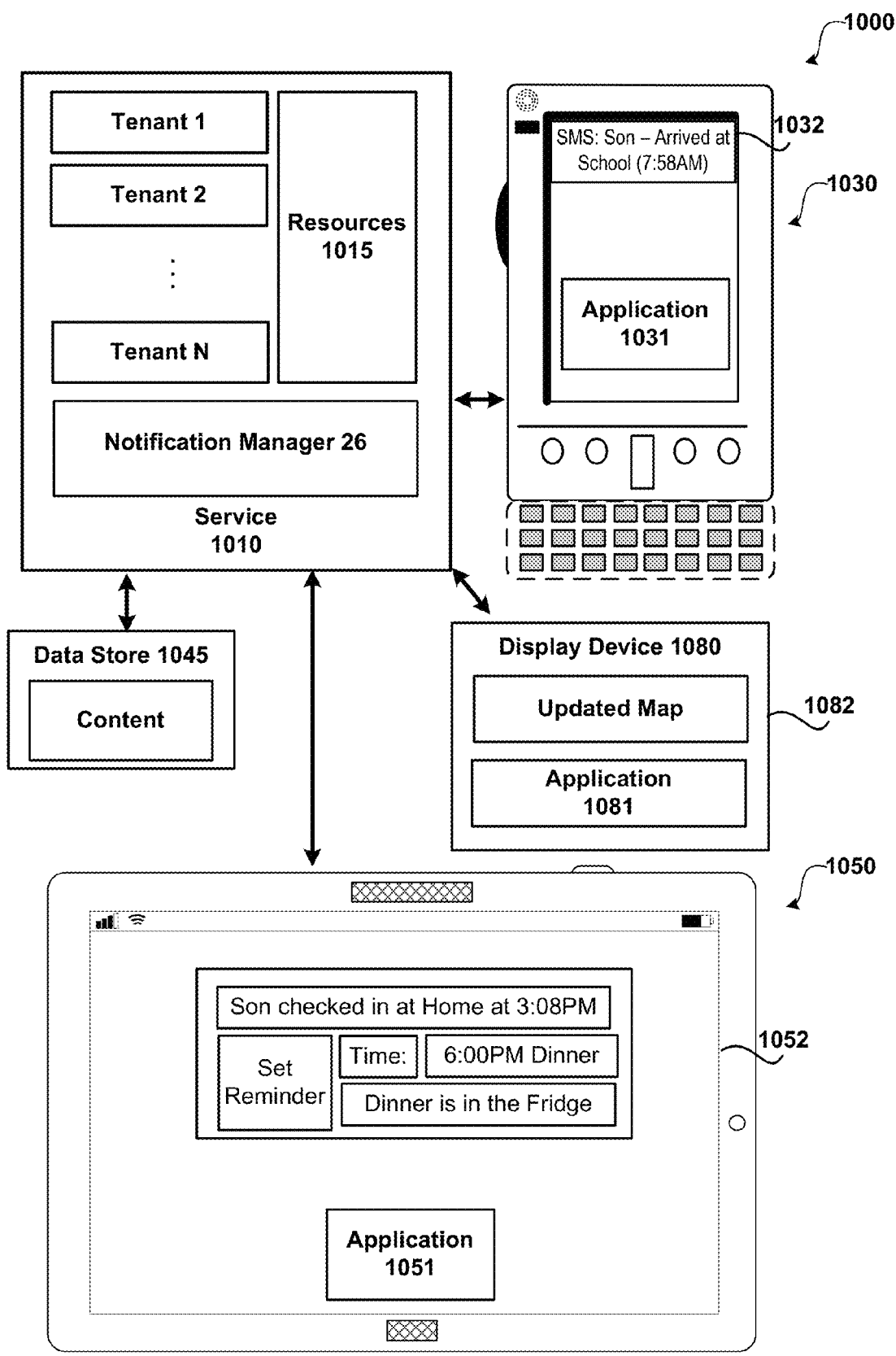
FIG. 7 illustrates an exemplary online system for delivering notifications using contextual information.

FIG. 7 illustrates an exemplary online system for delivering notifications using contextual information. As illustrated, system 1000 includes service 1010, data store 1045, touch screen input device 1050 (e.g. a slate), smart phone 1030 and display device 1080.

As illustrated, service 1010 is a cloud based and/or enterprise based service that may be configured to provide services, such as sharing services as described herein. Sharing functionality may be incorporated into one or more applications (e.g. searching, games, spreadsheets, social networks, and the like). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and device 1080 include a sharing application (1031, 1051, 1081).

As illustrated, touch screen input device 1050, smart phone 1030, and display device 1080 shows exemplary displays 1052/1032/1082 showing the use of an application displaying notifications. Data may be stored on a device (e.g. smart phone 1030, touch screen input 1050 and/or at some other location (e.g. network data store 1045). Data store 1045, or some other store, may be used to store contextual information as well as other data. The applications used by the devices may be client based applications, server based applications, cloud based applications and/or some combination. According to an embodiment, display device 1080 is a device such as a MICROSOFT XBOX coupled to a display.

Notification manager 26 is configured to perform operations relating to sending notifications as described herein. While manager 26 is shown within service 1010, the functionality of the manager may be included in other locations (e.g. on smart phone 1030 and/or touch screen input device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
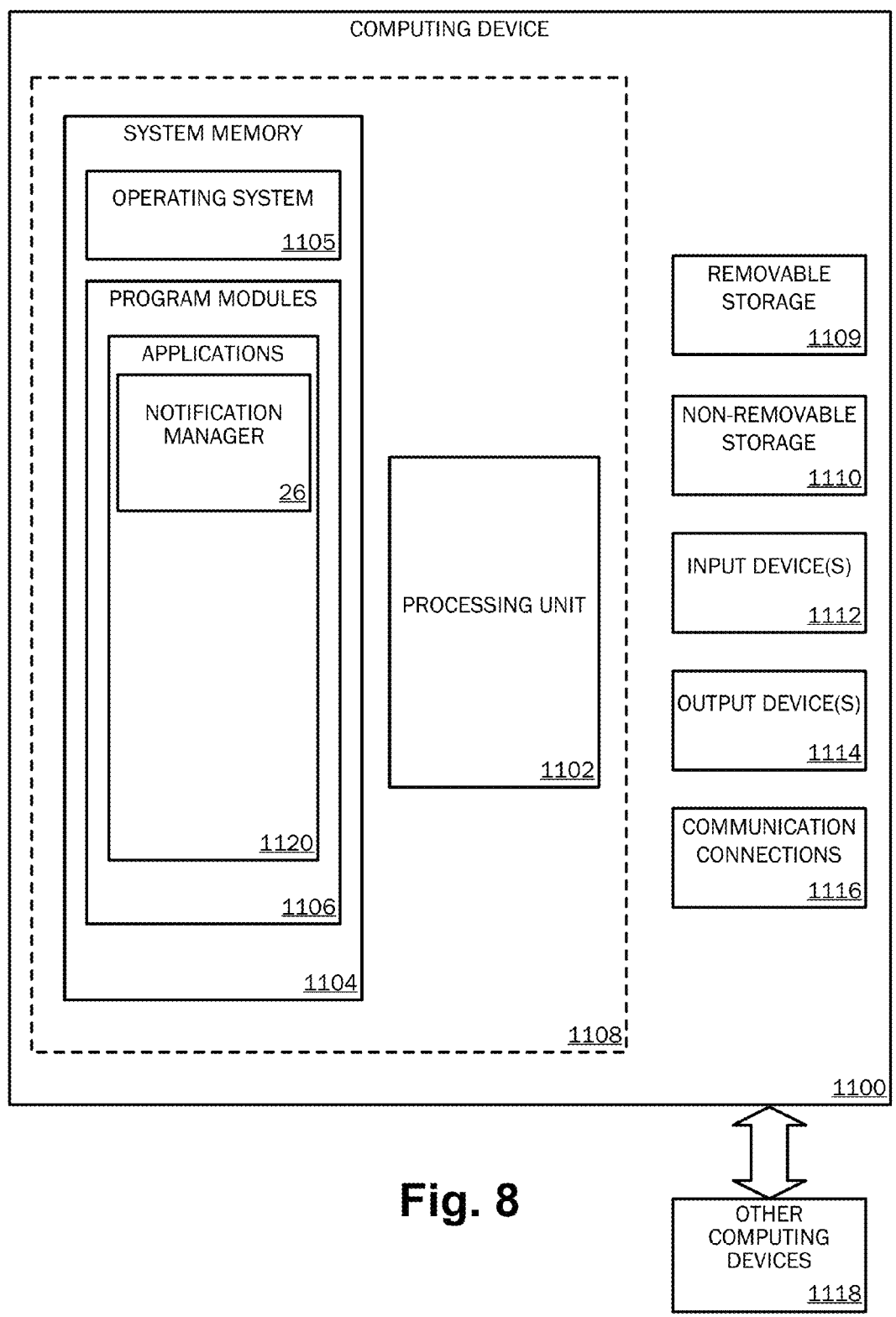
FIGS. 8, 9A, 9B and 10 and the associated descriptions provide a discussion of a variety of operating environments in which embodiments of the invention may be practiced.
Figure 9A:
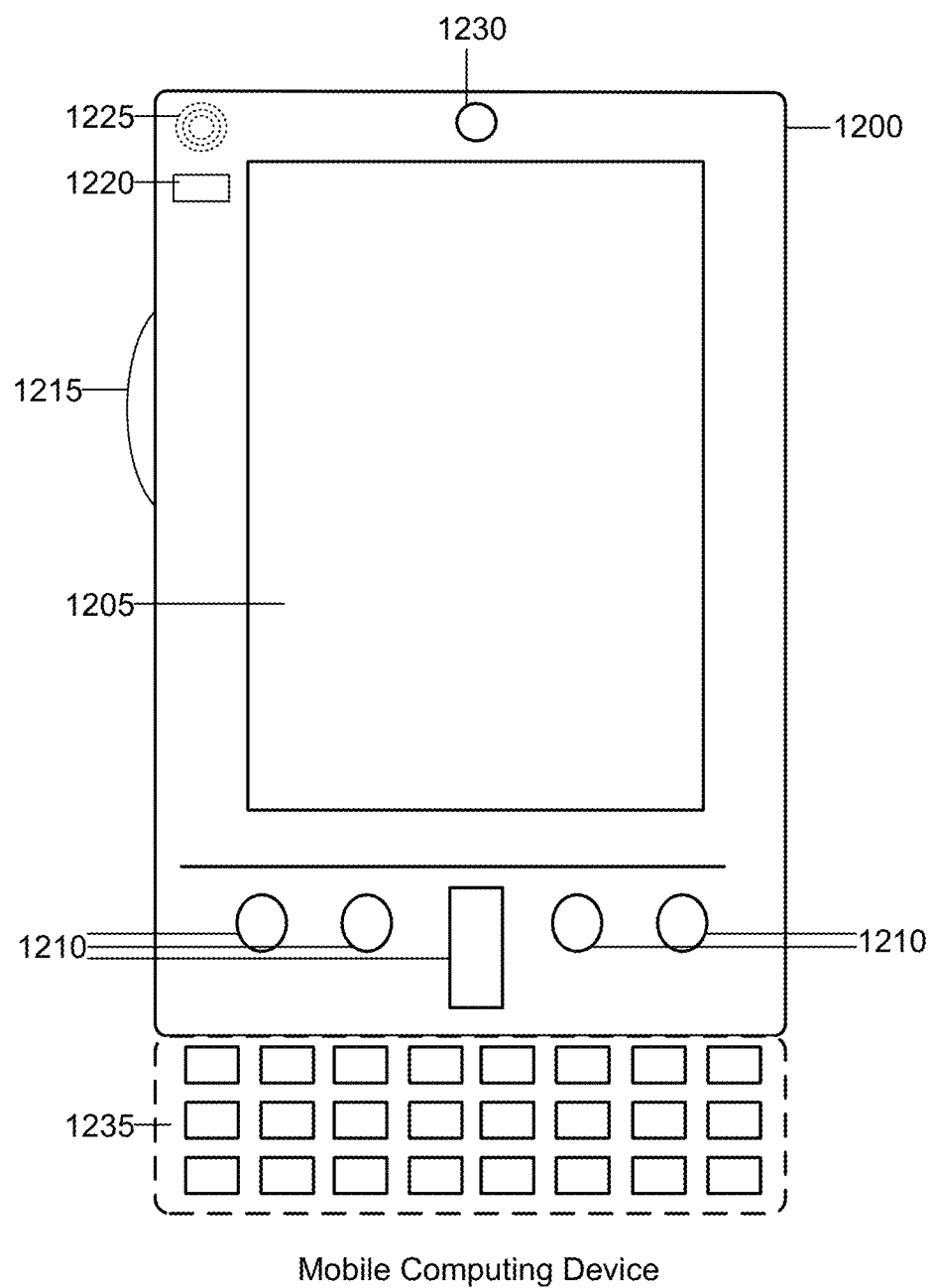
Figure 9B:
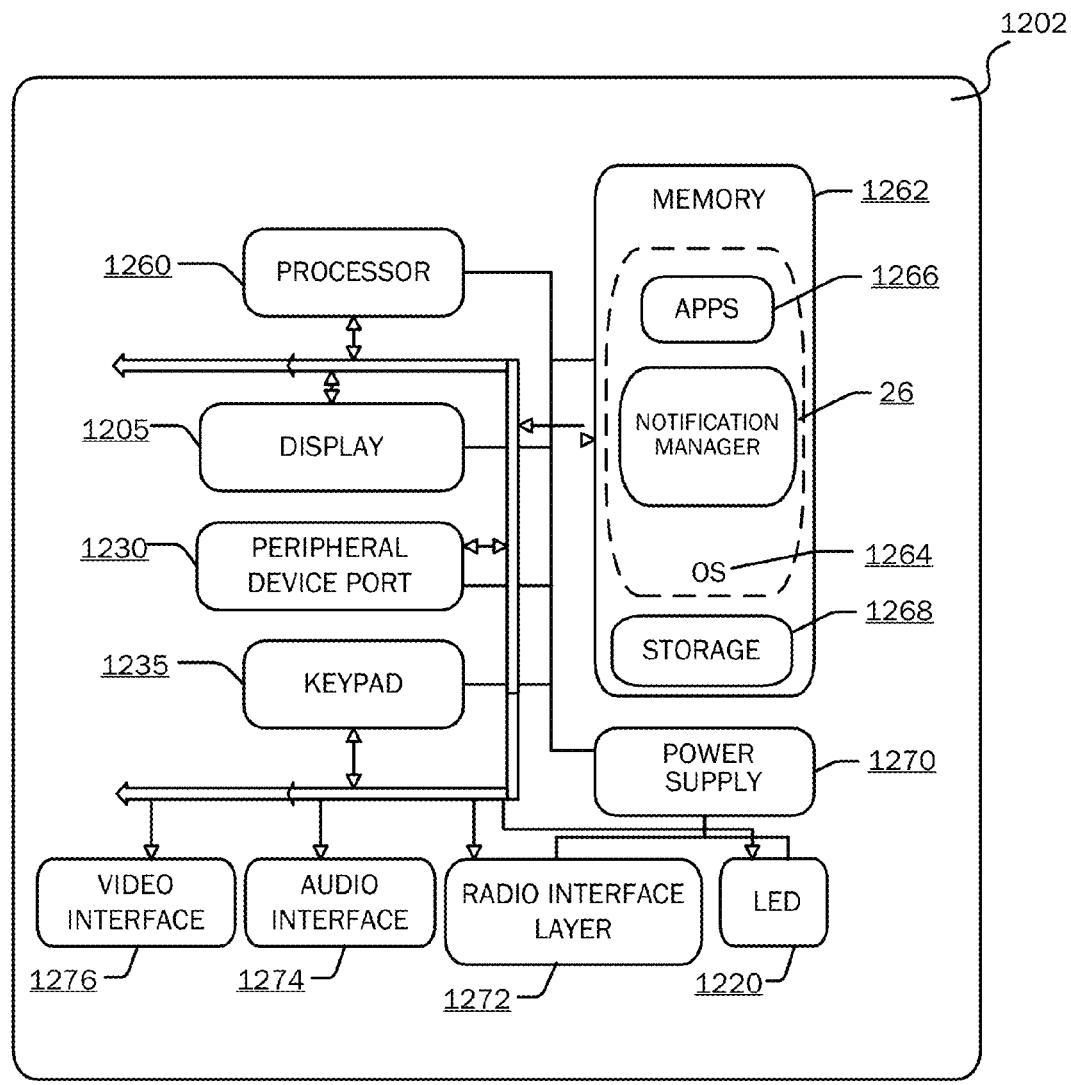
Figure 10:
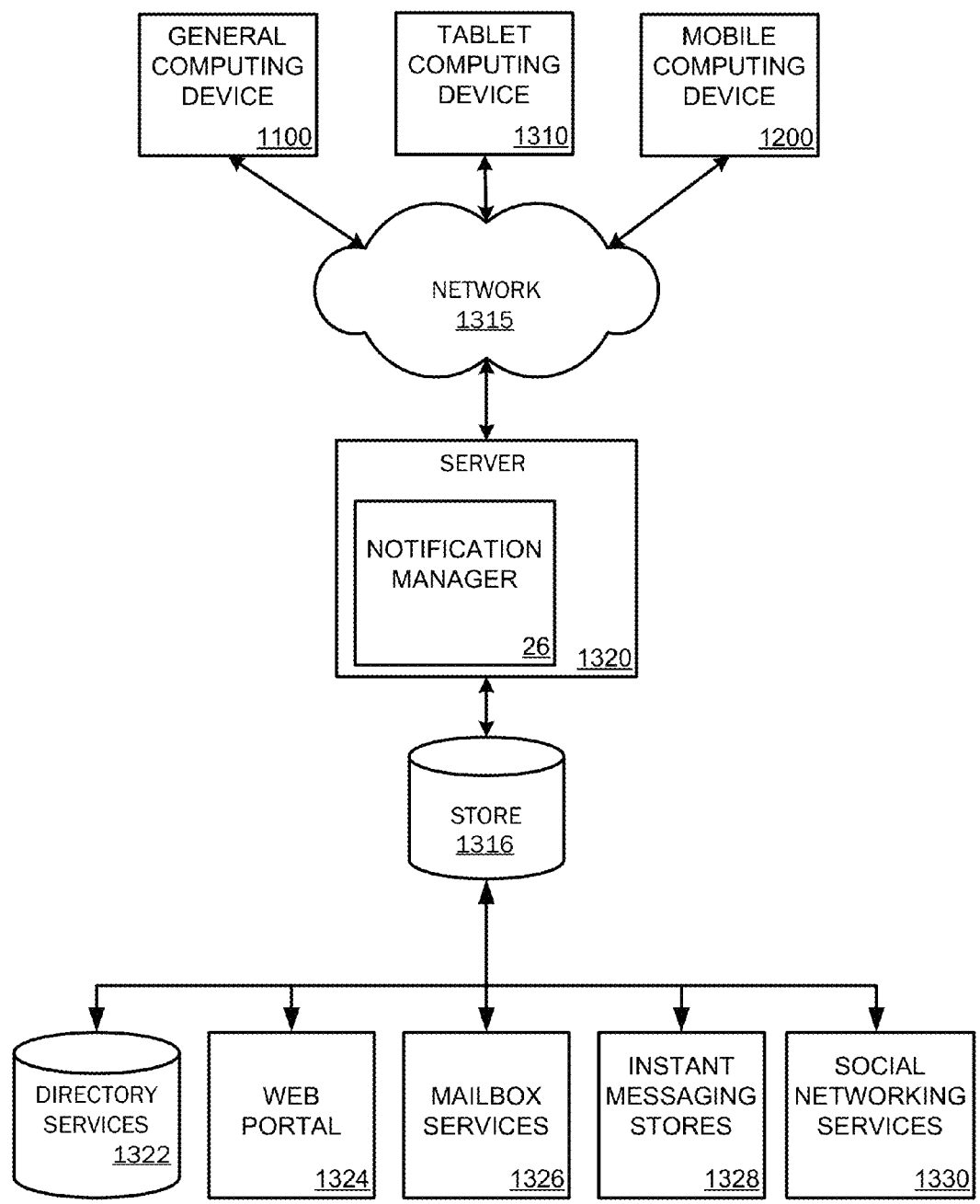

FIGS. 8-10 and the associated descriptions provide a discussion of a variety of operating environments in which embodiments of the invention may be practiced. However, the devices and systems illustrated and discussed with respect to FIGS. 8-10 are for purposes of example and illustration and are not limiting of a vast number of computing device configurations that may be utilized for practicing embodiments of the invention, described herein.

FIG. 8 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the notification manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 8 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 8 by a removable storage device 1109 and a non-removable storage device 1110.

As stated above, a number of program modules and data files may be stored in the system memory 1104. While executing on the processing unit 1102, the program modules 1106 (e.g., the notification manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the notification manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a mobile computing device 1200, for example, a mobile telephone, a smart phone, a tablet personal computer, a laptop computer, and the like, with which embodiments of the invention may be practiced. With reference to FIG. 9A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the notification manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 9B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 10 illustrates an embodiment of an architecture of an exemplary system, as described above. Content developed, interacted with, or edited in association with the notification manager 26 may be stored in different communication channels or other storage types. For example, various documents may be stored using a directory service 1322, a web portal 1324, a mailbox service 1326, an instant messaging store 1328, or a social networking site 1330. The notification manager 26 may use any of these types of systems or the like for enabling data utilization, as described herein. A server 1320 may provide the notification manager 26 to clients. As one example, the server 1320 may be a web server providing the notification manager 26 over the web. The server 1320 may provide the notification manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, and 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for delivering a notification, comprising:
   determining what information associated with contexts of members of a group may be collected;
   setting a reminder for a notification associated with an event to be delivered to a group member of the group based on a particular context of the group member;

determining a current context of the group member to receive the notification, wherein determining the current context comprises determining a location of the group member to receive the notification;
determining a current state of the event;
delivering the notification to the group member based on the current context of the group member being the particular context for delivering the notification;
determining when the group member, that received the notification, causes a state change of the event;
providing an update from the group member in response to the state change of the event; and
in response to providing the update, automatically sending a state notification to a different group member of the group that informs the different group member of the state change of the event wherein the different group member set the reminder for the notification.

2. The method of claim 1, wherein automatically sharing the state notification with the different group member comprises: determining a current context of the different group member; selecting a notification type based on the current context of the different group member; and delivering the state notification to the different group member using the selected notification type.

3. The method of claim 1, further comprising determining when to deliver the notification to the group member.

4. The method of claim 1, further comprising accessing a shared calendar for the group to determine the event.

5. The method of claim 1, further comprising: receiving a reminder including a message from one of the group members that is directed to the group member; sending the reminder to the group member; and receiving a response to the reminder that is delivered to at least the one of the group members.

6. The method of claim 1, wherein determining when the state change of the event occurs comprises receiving a response to the notification.

7. The method of claim 1, wherein determining the current context of the group member further comprises determining a type of device currently in use by the group member.

8. The method of claim 1, further comprising updating the current location of the group member in response to receiving a selection of an update location option.

9. The method of claim 1, further comprising receiving a location request for one of the group members and sharing the current location of the group member with other group members when authorized.

10. A computer-readable storage device storing computer-executable instructions for delivering a notification that is associated with an event in a calendar, comprising:
determining what information associated with contexts of members of a group may be collected;
setting a reminder for a notification associated with an event to be delivered to a group member of the group based on a particular context of the group member;
determining a current context of the group member to receive the notification, wherein determining the current context comprises determining a location of the group member to receive the notification;
determining a current state of the event;
delivering the notification to the group member using the selected notification type based on the current context of the group member being the particular context for delivering the notification;
determining when the group member, that received the notification, causes a state change of the event;
providing an update from the group member in response to the state change of the event; and
in response to providing the update, automatically sending a state notification to a different group member of the group that informs the different group member of the state change of the event wherein the different group member set the reminder for the notification.

11. The computer-readable storage device of claim 10, wherein automatically sharing the state notification with the different group member comprises: determining a current context of the different group member; selecting a notification type based on the current context of the different group member; and delivering the state notification to the different group member using the selected notification type.

12. The computer-readable storage device of claim 10, further comprising determining when to deliver the notification to the group member comprises determining when the group member is near a location that is associated with the event.

13. The computer-readable storage device of claim 10, further comprising: receiving a reminder including a message; sending the reminder to the group member; and receiving a response to the reminder that is delivered to at least one of the group members.

14. The computer-readable storage device of claim 10, wherein determining when the state change of the event occurs comprises receiving a response to the notification.

15. The computer-readable storage device of claim 10, wherein determining the current context of the group member further comprises determining a type of device currently in use by the group member.

16. The computer-readable storage device of claim 10, further comprising receiving a location request for one of the group members and sharing the current location of the group member with other group members when authorized.

17. A system for delivering a notification, comprising:
a processor and memory;
an operating environment executing using the processor; and
a notification manager performing actions comprising:
determining what information associated with contexts of members of a group may be collected;
setting a reminder for a notification associated with an event to be delivered to a group member of the group based on a particular context of the group member;
determining a current activity of a group member to receive the notification;
determining a current state of the event;
delivering the notification to the group member based on the current activity of the group member being the particular context for delivering the notification;
determining when the group member, that received the notification, causes a state change of the event;
providing an update from the group member in response to the state change of the event; and
in response to providing the update, automatically sending a state notification to a different group member of the group that informs the different group member of the state change of the event wherein the different group member set the reminder for the notification.

18. The system of claim 17, wherein automatically sharing the state notification with the different group member comprises: determining a current activity of the different group member; selecting a notification type based on the current activity of the different group member; and delivering the state notification to the different group member using the selected notification type.

19. The system of claim 17, further comprising determining when to deliver the notification to the group member comprises determining when the group member is near a location that is associated with the event.

20. The system of claim 17, further comprising: receiving a reminder including a message; sending the reminder to the group member; and receiving a response to the reminder that is delivered to at least one of the group members.

* * * * *